United States Patent [19]
Nikota

[11] 3,798,824
[45] Mar. 26, 1974

[54] SPRING TROLLING OR CASTING LEADER

[76] Inventor: John P. Nikota, 876 Riverdale Ave., Windsor, Ontario, Canada

[22] Filed: Nov. 1, 1972

[21] Appl. No.: 302,812

[52] U.S. Cl. ............................................. 43/43.15
[51] Int. Cl. ........................................... A01k 91/00
[58] Field of Search ................................... 43/43.15

[56] References Cited
UNITED STATES PATENTS
1,974,381   9/1934   Swanson et al. ............. 43/43.15 X Primary Examiner—Louis G. Mancene
Assistant Examiner—J. Q. Lever

[57] ABSTRACT

A spring steel wire leader in its relaxed condition is of roughly handwritten or script W-shaped configuration and has forward and rearward downwardly-concave arcuate loops of different arcuate extent or different circumferential lengths joined to one another at an upstanding intermediate junction with spiral line-attachment eyes at the forward and rearward ends and at the intermediate junction. A sinker attached to the forward eye slides along the bottom of the water course, while a fish lure connected to the rearward eye travels at a height above the bottom determined by the length of the rearward section of the leader, and a trolling or casting line connected to the intermediate eye draws this assembly through the water and at the same time partially straightens out the two arcuate loops of the leader. The resilience of the two loops constantly urges the lure upward and thereby prevents it from sinking to the bottom. The spiral forward eye to which the sinker is attached will unwind and straighten out and release the sinker if the latter becomes snagged on the bottom, thereby freeing the leader and the lure.

7 Claims, 3 Drawing Figures

PATENTED MAR 26 1974  3,798,824
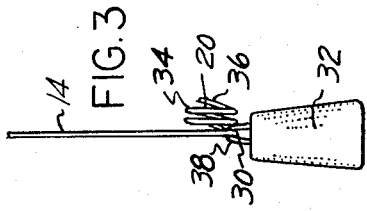
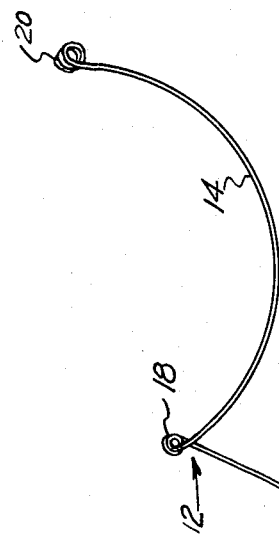
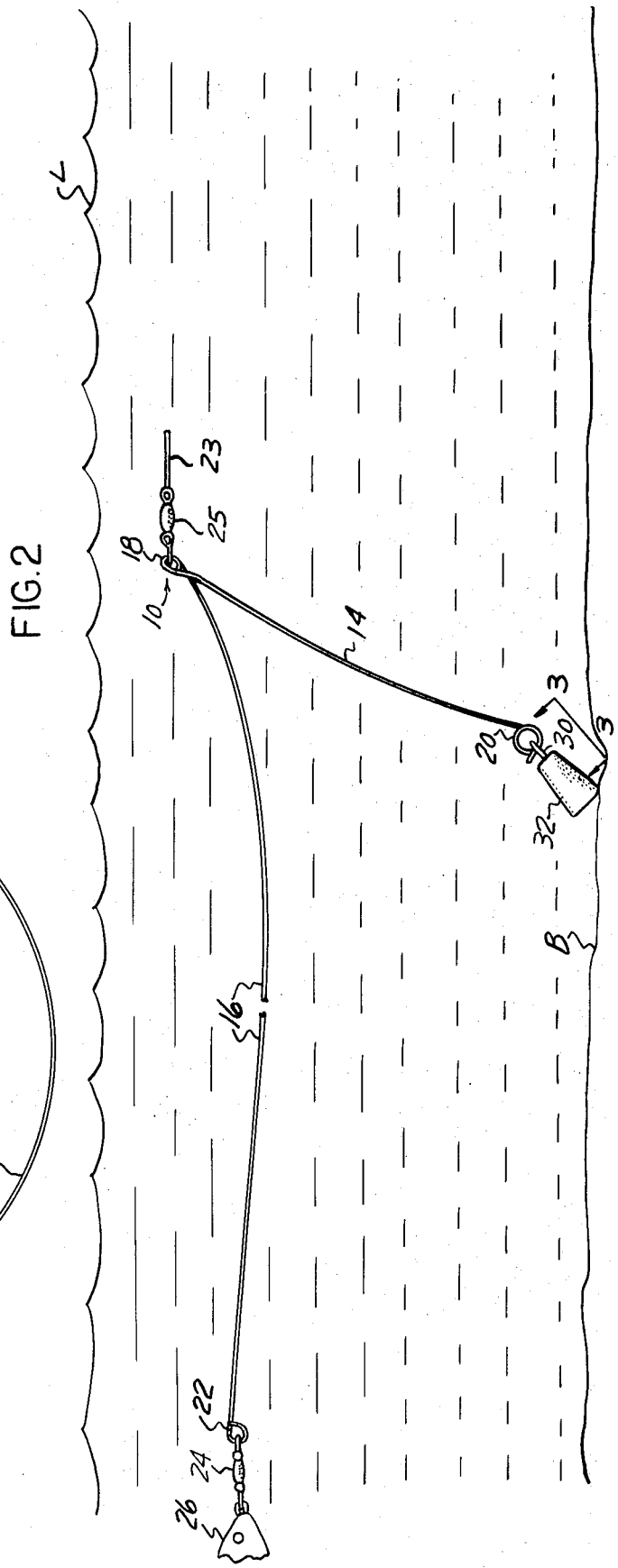

SPRING TROLLING OR CASTING LEADER

SUMMARY OF THE INVENTION

The roughly handwritten or script W-shaped spring wire leader maintains the lure at a predetermined height above the bottom and prevents it from sinking enough to get snagged thereon. Its arcuate loops partially straighten out during trolling or retrieving during casting, yet when the line slackens while the the towing boat is slowing up or making a turn, the two arcuate loops become more concave and the upward thrust of their resilience keeps the lure from sinking to the bottom. The unwinding of the spiral forward eye releases a snagged sinker and frees the remainder of the leader and lure assembly, thus preventing it from being lost along with the sinker.

In the drawing,

FIG. 1 is a top plan view, when laid on its side, of the spring trolling or casting leader in its relaxed position;

FIG. 2 is a side elevation of the spring trolling or casting leader of FIG. 1, showing its partially straightened condition while being drawn through the water, with a fish lure connected to the rearward eye and a sinker connected to the forward eye and dragging on the bottom of the water course; and FIG. 3 is a rear view, taken along the inclined line 3—3 in FIG. 2.

Referring to the drawing in detail, FIG. 2 shows a leader, lure and sinker assembly constituting a fishing assembly, generally designated 10, consisting of a spring steel wire trolling or casting leader 12 of roughly handwritten or script W-shaped configuration having forward and rearward loops 14 and 16 of downwardly concave form joined to one another at an upstanding intermediate eye 18. At its forward end the forward loop 14 has a spirally wound forward eye 20 and at its rearward end the rearward loop 16 has a spirally wound rearward eye 22. In their relaxed condition, as seen in FIG. 1, the forward and rearward eyes 14 and 16 are of more strongly curved arcuate configuration than when tensioned, and the forward loop 14 is of lesser length between the eyes 20 and 18 than the rearward loop 16 between the eyes 18 and 22. The spring wire leader 12 is conveniently made from a single length of spring steel wire with the loops 14 and 16 permanently arcuate in their relaxed condition of FIG. 1. Adapted to be secured to the intermediate eye 18 of the forward loop 14 through a swivel 25 is a flexible leader 23, preferably a gut leader connected through another swivel (not shown) to a conventional fishing line, such as is used in trolling or casting. The eyes 18, 20 and 22 constitute fishing implement attachment devices.

Connected to the rearward eye 22 of the rearward loop 16 is a conventional swivel 24 (FIG. 2), to the rearward end of which is connected a conventional fishing lure 26. Connected to the spirally wound forward eye 20 (FIGS. 2 and 3) is the eye 30 of a conventional sinker 32. The spirally wound forward eye 20, as its name indicates, is formed by spirally winding the forward end portion of the forward loop 14 in multiple spiral convolutions 34 terminating in the free end 36 (FIG. 3). The rearward and intermediate eyes 22 and 18 are preferably, although not necessarily, spirally wound like the forward eye 20. When the intermediate eye 18 is thus spirally wound with a plurality of turns, as clearly shown in FIGS. 1 and 2, it acts as a spiral spring portion also urging the rearward loop 16 upward.

In preparing the fishing assembly 10 for fishing, the fisherman threads the eye 30 of the sinker 32 over the end 36 of the forward eye 20 and by moving it in an orbital path around each convolution 34 brings it to the junction 38 where the forward eye 20 joins the forward loop 14, of which it is an integral part. The fisherman then connects the lure 26 through the swivel 24 to the rearward eye 22 and then connects the intermediate eye 18 to the swivel 25 which in turn is connected to the gut leader 23. The leader 23 is connected to the fishing line leading to the fisherman's rod and reel.

In operation, the fishing assembly 10 is thrown into the lake or other water course L either during casting or in preparation for trolling from a boat (not shown). As the assembly 10 is drawn through the water, either in retrieving the cast or as the boat moves forward in trolling, the forward and rearward loops 14 and 16 tend to straighten out and become of less concavity as shown in FIG. 2. Meanwhile, the weight of the sinker 16 upon the forward eye 20 causes the forward loop 16 not only to straighten out but also to be drawn downward so that the sinker 32 slides or is dragged along the bottom B of the water course L. The forward and rearward loops 14 and 16, because of the traction exerted upon them as they are drawn through the water, maintain their shallowly curved configuration, due in part also to the resistance imposed by the lure 26 traveling through the water and by the sinker 32 dragging along the bottom B.

If, however, the boat slows down or executes a turn, so that the fishing line and consequently the gut leader 23 slacken, the double-looped spring wire leader 12, and by the upward force imparted to the rearward loop 16 by the spirally-wound intermediate spring eye 18, by reason of its resilence, tends to resume the more strongly curved conditions of its forward and rearward loops 14 and 16. As a consequence, the resilience and consequent upward thrusts of the loops 14 and 16 and of the spirally wound intermediate spring eye 18 still maintain the intermediate eye 18 at an elevated location and the lure 26 under constant tension, thereby preventing the lure 26 from sinking to the bottom B.

In actual practice with one embodiment of the invention, it was found that in their relased condition when lying on their sides, the rearward loop 16 had an approximate radius of 6 inches and subtended an arc of about 275°, whereas the forward loop 14 had an approximate radius also of 6 inches and subtended an arc of about 65°, with a distance of about nine inches between the rearward and intermediate eyes 22 and 18 and a distance of about ten inches between the intermediate and forward eyes 18 and 20. When straightened out it was found that the rearward loop 16 had a length of about 29 inches and the forward loop 14 a length of about 12 inches. In other words, the rearward loop 16 has a greater circumferential length than the forward loop 14, as well as having a greater arcuate extent.

I claim:

1. A trolling or casting leader, comprising an elongated spring wire member having in its relaxed condition forward and rearward downwardly-concave arcuate loops and an upstanding helically wound intermediate spring eye connecting said forward and rearward loops between the adjacent ends thereof and integral therewith; and forward and rearward fishing implement connection eyes attached to said wire member at its forward and rearward ends.

2. A trolling or casting leader, according to claim 1, wherein said spring wire member in its relaxed condition is of roughly handwritten-W-shaped configuration.

3. A trolling or casting leader, according to claim 1, wherein said loops are of different arcuate extent.

4. A trolling or casting leader, according to claim 1, wherein said rearward loop has a greater arcuate extent than said forward loop.

5. A trolling or casting leader, according to claim 1, wherein said rearward loop has a greater circumferential length than said forward loop.

6. A trolling or casting leader, according to claim 1, wherein said forward sinker connection eye comprises a helically wound eye with a free end.

7. A trolling or casting leader, according to claim 1, wherein said rearward lure connection eye comprises a helically wound eye with a free end.

* * * * *